Oct. 14, 1958   P. E. BAKER   2,856,129
OPTICAL PULSE HEIGHT DISCRIMINATOR
Filed Dec. 21, 1954
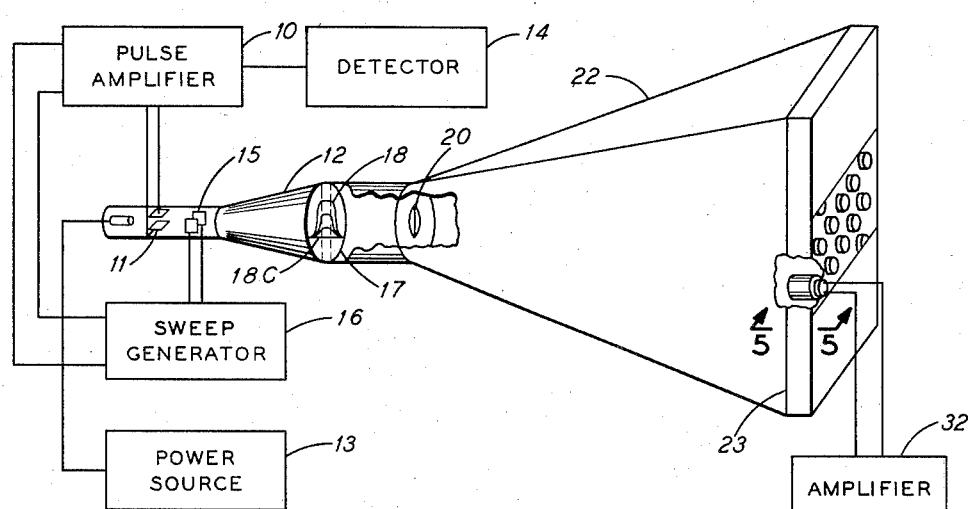
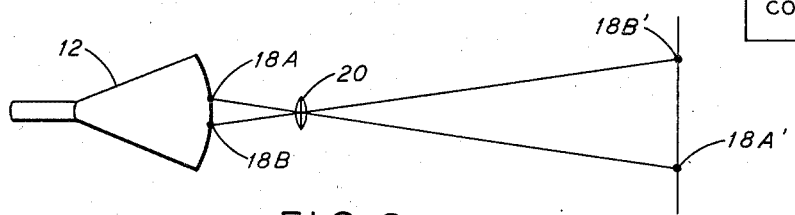
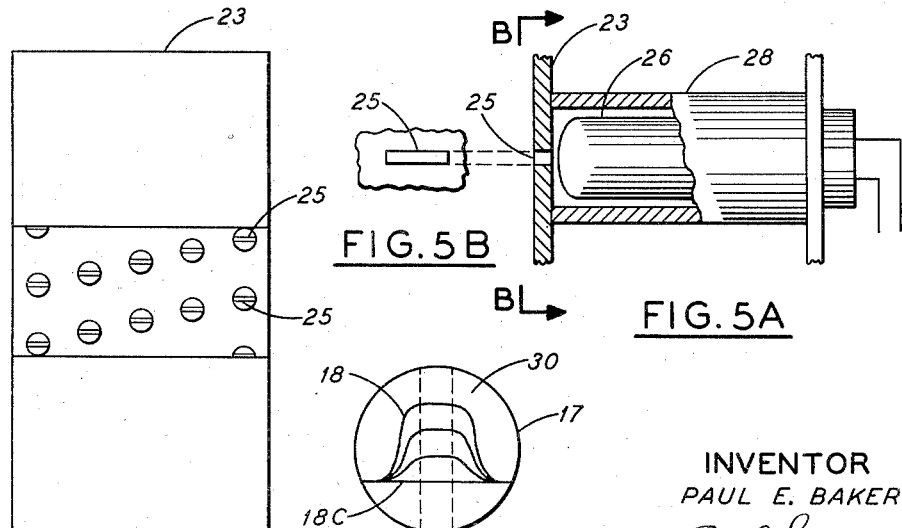
INVENTOR
PAUL E. BAKER
BY *A. L. Snow*
*Ralph L. Freeland, Jr.*
ATTORNEYS

United States Patent Office 2,856,129
Patented Oct. 14, 1958

2,856,129

OPTICAL PULSE HEIGHT DISCRIMINATOR

Paul E. Baker, Anaheim, Calif., assignor to California Research Corporation, San Francisco, Calif., a corporation of Delaware Application December 21, 1954, Serial No. 476,817

4 Claims. (Cl. 235—92)

The present invention relates to apparatus for sorting and counting a plurality of voltage pulses, more particularly to an apparatus for analyzing the pulse heights of a plurality of voltage pulses of unknown magnitudes, and has for an object the provision of a system for sorting said pulse heights by optically magnifying traces produced by said pulses on the screen of a cathode ray oscilloscope and counting the individual traces of each predetermined magnitude by positioning a photoelectric sensing unit to receive light pulses representing predetermined magnitudes of said voltage pulses.

Pulse analyzers for sorting and counting a plurality of voltage pulses are particularly useful in energy spectrum analyses where it is desired to plot a graph of pulse height versus frequency of occurrence. This type of pulse-height spectrum-analysis has found particular use in the analysis of nuclear reactions with a scintillation detector comprising a scintillation crystal and a multiplier phototube adapted to produce electrical pulses corresponding in magnitude to the energy of the nuclear events detected by the crystal. Pulse analyzers have been used heretofore which involve intricate electrical circuits and electronic discharge tubes, but such systems are particularly susceptible to variations in temperature and atmospheric conditions which affect the electrical characteristics of the circuits. Accordingly, such analyzers must be re-calibrated and repeatedly checked during their operation to assure proper analysis of the voltage pulses sorted and counted therein. Additionally, such pulse-height analyzers are inherently sluggish in operation, due to the parallel capacitative couplings between the driving amplifier and the first stage of each of the multiple channels of the analyzer. While each of such input capacitances is small, the combined effect is large so that large voltage and current changes are required for rapid response. Thus, the interconnection results in either comparatively slow action or excessive loading of the driving amplifier.

While it has been proposed heretofore that cathode ray tubes of special design be employed in the analysis of individual electrical pulses, the number of individual channels or counting circuits which can be obtained in a cathode ray tube of reasonable physical size is seriously limited. Additionally, such devices require complicated modifications and re-design of the cathode ray tube in order to perform pulse-height analysis. A primary difficulty with such systems has been the problem of aligning a sufficiently large number of individual targets both with respect to each other and with the deflection system for the cathode ray to permit multiple channel counting while maintaining the size of the tube within reasonable limits.

In accordance with the present invention, there is provided a pulse-height analyzer of high resolving power, capable of analyzing upwards of one million pulses per second while employing a conventional cathode ray oscilloscope. In accordance with the invention, an optical magnifying means is provided for viewing individual oscilloscopic traces displayed on the face of a cathode ray tube, each trace of which is applied as a vertical deflection superimposed on a horizontal deflection system of said tube by a triggered sweep circuit, so that each individual pulse is deflected along the vertical axis in proportion to its magnitude. Means are provided for optically magnifying a portion of each oscilloscopic trace to project the traces against a plurality of window means for interception by multiplier phototubes. Each individual trace of microsecond duration may thus be amplified and then counted in accordance with its statistical frequency of occurrence.

Further objects and advantages of the present invention will become apparent from the following detailed description taken in conjunction with the accompanying drawing, which forms an integral part of the present specification.

In the drawing:

Fig. 1 is a diagrammatic representation of a pulse height analyzer or discriminator constructed in accordance with the present invention.

Fig. 2 is a diagrammatic representation of the optical magnifying system utilized in the analyzer of Fig. 1.

Fig. 3 is a schematic view of the face of the cathode ray oscilloscope when operated in accordance with the present invention, particularly illustrating a method of masking the face of the tube to select a desired portion of the traces to be utilized by the analyzer.

Fig. 4 is an end elevation view of the window portion of the analyzer of Fig. 1.

Fig. 5A is a side elevation view, partially in section, taken in the direction of arrows 5—5 of Fig. 1.

Fig. 5B is a front elevation view in the direction of arrows B—B in Fig. 5A.

Referring now to the drawing, and in particular to Fig. 1, there is illustrated therein a preferred embodiment of a pulse analyzer constructed in accordance with the present invention. In this embodiment, voltage pulses of unknown but of a predeterminable range of magnitudes are applied by a pulse amplifier 10 to one set of deflection plates 11 of a cathode ray tube 12 which, for example, may be the image tube of a cathode ray oscilloscope. As indicated, these pulses of voltage may be developed in response to the magnitude of a nuclear event measured by detector 14, which may be a scintillometer, with the order of events being purely random in character, but having an exceptionally high rate of repetition.

In accordance with the invention, these randomly occurring pulses of unknown magnitudes are applied by the pulse amplifier 10 to the vertical deflection plates 11, and also are applied to the triggering circuit of the sweep generator so that the beam moves horizontally at a uniform speed, the horizontal motion starting at the same time as the vertical deflection. Thus, it is possible for each individual pulse height to be translated into a distance of deflection represented as indicated by the traces 18. Desirably, the cathode ray screen 17 has a phosphor of relatively low persistence so that each individual cathode ray trace 18 will decay in light intensity immediately after each trace has been made in response to a voltage pulse.

Further, in accordance with the present invention, an optical magnifying means, such as convex lens 20, is positioned at substantially its focal length with respect to the face of cathode ray screen 17 and mounted within a substantially light-tight box 22 so that individual light pulses appearing on screen 17 may be amplified and projected onto the receiving screen, or target, 23 with the distance between each individual pulse height greatly magnified by the amplification factor of the optical magnifying system. The manner in which two individual traces 18A and 18B are magnified by lens 20 to the lines 18A' and 18B' is particularly illustrated in Fig. 2.

The target 23 is provided with a plurality of window means which are particularly illustrated in Fig. 4. As there shown, a plurality of rectangular openings arranged in substantially stair-step sequence from right to left, as seen in Fig. 4, permits the individual apertured openings to be closely positioned in a vertical direction but sufficiently spaced so that an individual photomultiplier tube may be arranged behind each of the windowed apertures for detection and counting of light pulses directed thereinto by the optical magnifying system. As indicated, each of the photoelectric tubes 26 is desirably encased in a light-type cell, such as cylinder 28, with its photocathode face being exposed to the aperture 25 in target 23, as particularly illustrated in Figs. 5A and 5B.

Desirably, the screen 17 of cathode ray tube 12 is provided with a mask 30 for substantially blocking out those portions of each light trace which result from the build-up and decay of the pulse to and from its maximum amplitude. As indicated in Fig. 3, this mask 30 has a vertically elongated slot which permits only the center portion of the traces 18 to be transmitted therethrough for magnification by lens 20 on the target means 23.

In accordance with the invention, each individual photoelectric tube 26 is connected through an amplifier 32 to a counter 33 for the registration of the individual electrical pulses of predeterminable magnitude corresponding to the relative position of the light pulses to the base line 18c, as established on screen 17. Alternatively, a rate meter may be substituted for the counters 33 to give an indication of the rate of repetition of counts in each channel. Because the trace images 18 have finite widths, there are trace positions at the upper and lower edges of window 25 where the traces fall only partly on the window. When this occurs, the photomultiplier tube directly behind that window will produce a smaller pulse. In accordance with the invention, adjustment of amplifier gain may be made so that only light traces of a predetermined value will trigger the counter 33. In this way, the smaller pulses may be ignored by suitable adjustment of the gain. The actual channel width, accordingly, is adjustable and permits convenient equalization of the width of the separate channels formed on the individual windows 25 in target 23. Such adjustment permits the system to be calibrated easily and accurately even though the accuracy of machining or forming the individual pulse channels by the cutting of windows 25 may be slightly erratic. While only a single amplifier and recorder combination has been shown as being connected to one photoelectric tube 26, it will be apparent that the number of channels is made very large, that is, upwards of one hundred and more, within relatively small over-all dimensions while using a conventional-size cathode ray tube. In practice, it has been found that a five-inch diameter cathode ray tube will permit resolution of the traces into about 100 counting channels with target 23 having a height of about four feet.

From the foregoing description, it will be seen that the present arrangement of an optical magnifying system, adapted to view oscilloscopic traces applied in extremely rapid succession to a cathode ray tube, provides a simple and accurate pulse height discriminator when combined with a plurality of multiplier phototubes, each of which is individually positioned in acordance with one of a plurality of voltage pulses of predetermined magnitude.

Various modifications may be made in the apparatus shown in the drawing and described above. One possible modification is the substitution of an optically divergent mirror for the convex lens 20, with target 23 positioned above or below cathode ray tube 12, or to one side thereof.

Various other modifications and changes in the preferred embodiment of the present invention will occur to those skilled in the art from the foregoing detailed description. However, all such modifications and changes which fall within the scope of the appended claims are intended to be embraced thereby.

I claim:

1. A pulse height analyzer for sorting and counting pulses of voltage of a predeterminable range of values comprising a cathode ray tube having an optical recording surface, means responsive to each pulse for horizontally traversing said optical recording surface with a cathode ray beam, means responsive to each of said pulses of voltage for vertically deflecting the cathode ray beam relative to a base line and in proportion to the magnitude of each of said pulses, optical magnifying means laterally displaced from said recording surface for projecting a magnified image of each trace of said cathode ray beam appearing on said optical recording surface onto a plurality of window means, a plurality of photoelectric amplifying means, each of said photoelectric amplifying means being positioned behind one of said window means to receive a predeterminable portion of said magnified images of said traces, a counter means for each of said plurality of photoelectric amplifying means for registering the relative numbers of each pulse of voltage of a predeterminable amplitude.

2. A pulse height analyzer for sorting and counting pulses of voltage of a predeterminable range of values comprising a cathode ray tube having an optical recording surface, means responsive to each pulse for traversing said optical recording surface with a cathode ray beam to form a base line, means responsive to each of said pulses of voltage for deflecting the cathode ray beam perpendicularly to said base line and in proportion to the magnitude of each of said pulses, optical magnifying means laterally displaced from said recording surface for projecting a magnified image of each trace of said cathode ray beam appearing on said optical recording surface onto a plurality of window means, a plurality of photoelectric amplifying means, each of said photoelectric amplifying means being positioned behind one of said window means to receive said magnified images of said traces, each of said amplifying means being spaced apart to define a channel for voltage pulses of one of said predeterminable range of values, and counter means for each of said plurality of photoelectric amplifying means for registering the relative numbers of each pulse of voltage in each of said channels.

3. A pulse height analyzer for sorting and counting voltage pulses of a predeterminable range of values comprising a cathode ray tube having a fluorescent screen for optically displaying traces of the cathode ray beam thereacross, means responsive to each pulse for traversing the surface of said screen with said cathode ray beam, means responsive to the amplitude of each of said pulses for deflecting said cathode ray beam transversely to the pulse-traversing direction, optical means laterally displaced from said fluorescent screen for optically diverging the traces appearing on said screen, target means laterally displaced from said optical means for reception of the optically diverged traces, said target means having a plurality of window means formed therein, said window means being vertically and laterally spaced on said target means, a photoelectric multiplier tube associated with each of said window means in said target means for reception of an individual trace produced in response to a pulse of a predetermined value within said predeterminable range of values, and counter means connected to each of said photoelectric multiplier tubes for registering the relative number of pulses of said predetermined value received at said target means.

4. A pulse height analyzer for sorting and counting voltage pulses of a predeterminable range of values comprising a cathode ray tube having a fluorescent screen for optically displaying traces of the cathode ray beam thereacross, means responsive to each pulse for traversing the surface of said screen with said cathode ray beam, means responsive to the amplitude of each of said pulses for deflecting said cathode ray beam transversely to the pulse-traversing direction, a light-tight housing surrounding the display surface of said screen, optical means within said housing and laterally displaced from said fluorescent screen for optically diverging the traces appearing on said screen, target means at the opposite end of said housing for reception of the optically diverged traces, said target means having a plurality of window means formed therein, said window means being vertically and laterally spaced on said target means, a photoelectric multiplier tube having its photosensitive surface associated with each of said window means in said target means for reception of an individual trace produced in response to a pulse of a predetermined value within said predeterminable range of values, and counter means electrically connected to each of said photoelectric multiplier tubes for registering the relative number of pulses of said predetermined value received at said target means.

References Cited in the file of this patent

UNITED STATES PATENTS

| | | |
|---|---|---|
| 2,525,475 | Boykin et al. | Oct. 10, 1950 |
| 2,613,273 | Kalfain | Oct. 7, 1952 |
| 2,617,042 | Wouters | Nov. 4, 1952 |
| 2,736,802 | Cranberg | Feb. 28, 1956 |